United States Patent Office 3,109,830
Patented Nov. 5, 1963

3,109,830
PENTAERYTHRITOL-ACROLEIN REACTION
PRODUCTS AND THEIR PRODUCTION
Bernard H. Silverman, Maspeth, N.Y., and Ely Balgley, Dearborn, Mich., assignors to Heyden Newport Chemical Corporation, New York, N.Y., a corporation of Delaware
No Drawing. Filed Mar. 18, 1959, Ser. No. 800,098
4 Claims. (Cl. 260—67)

The present invention relates to the production of stable pentaerythritol-acrolein reaction products. More particularly it relates to the production of stable pentaerythritol-acrolein reaction products which can be cured to form clear, cloud-free resins. The present invention is also concerned with the novel, stable products resulting from the present process.

This application is a continuation-in-part of our co-pending application Serial No. 558,200, filed January 10, 1956, now abandoned.

Pentaerythritol and acrolein can be reacted under acidic conditions to produce synthetic resins. The resinification takes place in two stages: in the first stage pentaerythritol and acrolein react to form a prepolymer, which is essentially a mixture of monoallylidenepentaerythritol and diallylidenepentaerythritol and low molecular weight condensation products of these compounds; in the second stage the prepolymer is cured in the presence of an acidic condensation catalyst to form a hard resin. The acetalization reaction occurring in the first stage takes place in the presence of an acidic catalyst substantially in accordance with the following equations to form an aqueous solution of prepolymer:

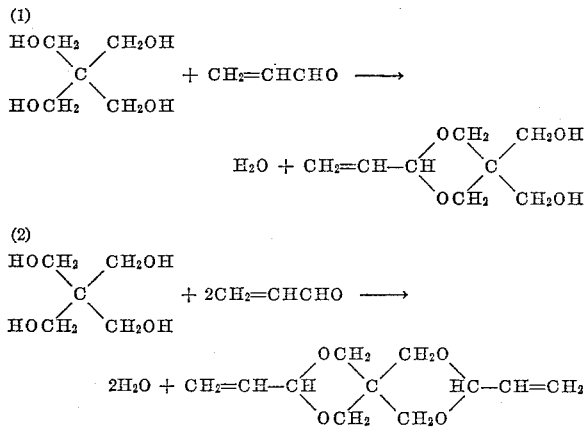

In the second stage and after dehydration to remove the water formed during the first stage and at least most of any unreacted acrolein, the prepolymer is cured in the presence of an acidic condensation catalyst to form a resinous product. In this curing stage the monoallylidenepentaerythritol and diallylidenepentaerythritol react with monoallylidenepentaerythritol and pentaerythritol, if any unreacted pentaerythritol is present, to form a hard resin. While the reactions taking place during the second or curing stage are not fully understood, apparently both polymerization and condensation reactions take place with crosslinking resulting from the reaction of the hydroxyl groups with the unsaturated portion of the acetal molecule.

To form on curing a resin having good mechanical properties, the prepolymer must contain some monoallylidenepentaerythritol. The maximum amount of acrolein which can be reacted with pentaerythritol in the first stage is therefore somewhat less than 2 moles of acrolein per mole of pentaerythritol. The minimum amount of acrolein is about one mole per mole of pentaerythritol, an amount which will produce a prepolymer containing monoallylidenepentaerythritol, diallylidenepentaerythritol, and some unreacted pentaerythritol. In general we prefer to react about 1.2–1.8 moles of acrolein with each mole of pentaerythritol.

The prepolymers are prepared by reacting pentaerythritol with acrolein in the presence of an acidic condensation catalyst and in an atmosphere of an inert gas at a temperature of approximately 60°–95° C. for 1 to 4 hours. The acetalization reaction is continued until the prepolymer has before dehydration a Gardner-Holdt viscosity of E to R, preferably of J–L. After dehydration, the prepolymer formed in this way has a molecular weight between 275 and 400, a hydroxyl content between 8.7% and 10%, an iodine number between 90 and 130, and a Gardner-Holdt viscosity of T to Z–7. The preferred prepolymer has a molecular weight between 315 and 340, a hydroxyl content of about 9%, an iodine number between 100 and 120, and a viscosity of about Z.

While p-toluenesulfonic acid is a preferred catalyst for the acetalization reaction, other acidic condensation catalysts, such as oxalic acid, hydrochloric acid, phosphoric acid, boron trifluoride, and the like, may also be used.

At times it is desirable to store or hold for prolonged periods the prepolymer produced during the first stage. The prepolymer which contains acidic condensation catalyst is very unstable and cannot be stored since the catalyst promotes curing and the formation of undesirable by-products. It is very difficult, if not impossible, to separate the prepolymer from the acidic catalyst by known means. It has been proposed that the catalyst be neutralized by the addition of sodium hydroxide or sodium acetate. While neutralization of the catalyst in this manner does produce a stable product, the salts formed tend to contaminate the product, and the cured resin is cloudy or hazy. This cloudiness is, of course, undesirable. In addition considerable care must be exercised in carrying out such a neutralization step to avoid the addition of an excess of basic material since such an excess will cause any free acrolein that is present to polymerize and to form insoluble compounds. Acrolein polymerizes so readily under alkaline conditions that care must be taken to avoid forming localized zones having an alkaline pH when the alkaline material is added. Choline has also been suggested as a neutralizing agent for pentaerythritol acrolein propolymers. Its use results in clear, haze-free products. The presence of the choline salt in the cured resin may, however, have a deleterious effect on the electrical properties of the cured resin.

We have discovered a method for the production of a pentaerythritol-acrolein prepolymer which is stable and which on curing forms clear resins having good mechanical and electrical properties. We have found that when an aqueous solution of the prepolymer is mixed with a basic anion exchange resin the anion exchange resin forms with the catalyst a complex which can be separated readily from the prepolymer. The basic anion exchange resin will form complexes with the small amounts of acidic compounds which may be formed as by-products of the acetalization reaction. Following removal of the anion exchange resin-acidic compound complex by, for example, filtration, the aqueous solution can be dehydrated to yield a prepolymer free of acidic catalyst and salts of the catalyst which is stable and which can be safely stored for long periods of time. The prepolymer which has been treated in this way can be cured subsequently in the presence of an acidic catalyst to form a clear resin which is free of both salts and acidic contaminants.

A wide variety of basic anion exchange resins may be used to yield the novel and desirable products of this invention. These include both weakly basic and strongly basic anion exchange resins. Illustrative of the weakly basic anion exchange resins are Amberlite IR-4B, a polyamine modified phenol-formaldehyde condensation product manufactured by Rohm & Haas Co.; Permutit CCG, a polyamine modified phenol-formaldehyde condensation product manufactured by Permutit Co.; DeAcidite, an aliphatic amine type anion exchange resin manufactured by Permutit Co.; and Duolite A-2 and A-3, quaternary amine resins manufactured by Chemical Process Co. Among the strongly basic anion exchange resins that have proven useful in this process are Amberlite IRA-400 (Rohm & Haas Co.); Permutit S (Permutit Co.); Dowex 2 (Dow Chemical Co.); and Duolite A-101 (Chemical Process Co.), all of which are quaternary amine type resins. The basic anion exchange resin chosen for use in this process must be capable of reacting with the acidic compounds present to form a complex which can be readily removed from the aqueous solution of the prepolymer. It must also be capable of being regenerated by treatment with an alkaline compound, such as sodium hydroxide.

To obtain products having the desired characteristics it is necessary that the treatment of the prepolymer with the basic anion exchange resin be carried out in the presence of water. This may be done by contacting with the basic anion exchange resin the aqueous solution of prepolymer which results from the reaction of pentaerythritol with acrolein in the presence of an acidic catalyst. An additional amount of water may be added to the aqueous prepolymer solution if desired to reduce its viscosity and to facilitate its treatment with the anion exchange resin and its subsequent separation from the resin. The solution may then be dehydrated to yield a stable, substantially anhydrous prepolymer. In this procedure either a strongly basic or a weakly basic anion exchange resin may be used. Because free acrolein may be present during the deionization step and because free acrolein will polymerize rapidly at a pH above 7, we prefer to use a weakly basic anion exchange resin when the procedure is carried out in this way.

In another embodiment of this invention the aqueous prepolymer resulting from the acetalization reaction is heated under reduced pressure to remove substantially all of the water and unreacted acrolein. Water is then added to the dehydrated prepolymer and the resulting solution is then treated with a basic anion exchange resin. In this case because no free acrolein is present in the prepolymer solution we prefer to use a strongly basic anion exchange resin. Cured resins prepared from prepolymers treated in accordance with this procedure are characterized by excellent heat- and color-stability.

In these procedures the dehydration of the aqueous solutions of the prepolymer may be effected by evaporation by heating at reduced pressure or by any other convenient procedure.

Treatment of the prepolymer with a basic anion exchange resin in the absence of a solvent or in the presence of an organic solvent, such as alcohol or acetone, in which the prepolymer is soluble and the anion exchange resin is insoluble does not yield the desired product.

The contacting of the aqueous solution of the prepolymer with the basic anion exchange resin may be accomplished by conventional manipulative procedures. For example, the prepolymer solution may be flowed through a bed of the anion exchange resin and the deionized prepolymer recovered as the effluent. Alternatively particles of the resin may be added to the aqueous solution of the prepolymer and subsequently removed by filtration. In this procedure the anion exchange resin may be added in increments until the pH of the solution is in the range of 6-7, preferably about 6.5.

The following examples illustrate the present invention.

*Example 1*

The reaction was carried out in a flask equipped with a reflux condenser. The reactants consisted of 2448 grams (18 moles) of pentaerythritol, 1680 grams (30 moles) of freshly distilled acrolein, 13.5 grams of p-toluenesulfonic acid dihydrate, and 1.68 grams of hydroquinone. Hydroquinine, a polymerization inhibitor, was used to prevent self-polymerization of the acrolein. The mixture was heated with agitation to 48° C. in 10 minutes. Heating was continued until the temperature of the reaction mixture rose to 79° C. and the reaction mixture was held at 79°–81° C. for 75 minutes. During the reaction a stream of nitrogen was bubbled through the reaction mixture. The reaction was carried out at atmospheric pressure. The cooled reaction liquor was a viscous, clear, slightly yellow liquid.

To the cool, reaction liquor there was added 360 grams of Permutit CCG (Permutit Co.) along with 360 grams of water. This mixture was stirred for 5 hours. At the end of this time the mixture, which had a pH of 6.5, was filtered on a pressure filter to remove the anion exchange resin and the resin p-toluenesulfonic acid complex which had been formed. The filtrate was dehydrated by heating it to a temperatuare of 40°–50° C. at an absolute pressure of 120 mm. of mercury until 800 grams of water and unreacted acrolein had been removed. Heating was then continued at 80° C. at an absolute pressure of 10–20 mm. of mercury for an hour to achieve complete dehydration. The dehydrated prepolymer had a hydroxyl content of 9.1%, an iodine number of 102, and a molecular weight of about 320. The product weighed 3926 grams.

The stable deionized prepolymer, which was free of acidic catalyst and salts of this catalyst, was mixed with 0.5% of p-toluenesulfonic acid catalyst in the form of a 50% methanol solution. The mixture was then cured at 75° C. for 5 hours. In this manner a hard, clear light yellow resin was obtained which was free of cloudiness.

*Example 2*

A viscous aqueous solution of prepolymer was prepared by the method described in Example 1 and was treated with the same amount of Permutit CCG. The deionized prepolymer was dehydrated by heating it a 50° C. at an absolute pressure of 130 mm. of mercury until 250 grams of distillate had been collected. Thereafter the pressure was reduced, and the residue was heated at 50° C. at an absolute pressure of 15 mm. of mercury until an additional 600 grams of distillate had been collected. The dehydrated stable deionized prepolymer weighed 3200 grams and had a molecular weight of 332. It had a hydroxyl content of 9.1% and an iodine number of 112.

The dehydrated deionized prepolymer was cured by heating it for 20 minutes at 120° C. with a 50% solution of p-toluenesulfonic acid in methanol. The amount of catalyst used was 0.5%. The product was a clear, light brown resin having the following characteristics:

Tensile strength (D-651)\* _____ 9,860 p.s.i.
Compressive strength (D-695)\* _ 13,170 p.s.i.
Flexural strength (D-790)\* ____ 15,350 p.s.i.
Impact strength (D-256)\* _____ 0.69 ft. lb./in. of notch.
Rockwell hardness (D-785)\* __ L-110.
Heat distortion temperature
 (D-648)\* _____ 175° F.

\* The number in parenthesis refers to the test method of the American Society for Testing Materials that was used. For a description of these test methods, see "A.S.T.M. Standards," 1949, Part 6 (Electrical Insulation, Plastics, Rubber).

*Example 3*

An aqueous solution of prepolymer was prepared by the method described in Example 1. This solution was heated at 50° C. at an absolute pressure of 130 mm. until 250 grams of water and unreacted acrolein had been collected. Then the heating was continued at 80° C. at an absolute pressure of 15 mm. until the prepolymer was substantially free of water and unreacted acrolein. The prepolymer was then mixed with 800 grams of water, and the resulting solution was passed through a column which contained Amberlite IRA–400 anion exchange resin. The deionized effluent was dehydrated by heating it first at 50° C. to an absolute pressure of 120 mm. and then at 80° C. at an absolute pressure of 25 mm. until approximately 800 grams of distillate had been collected. The dehydrated product was clear and stable. When this product was heated with a catalytic amount of p-toluenesulfonic acid at 75° C. for 3 hours, a hard, clear, very pale yellow resin was obtained.

In the foregoing examples, the stable dehydrated prepolymers were cured with the aid of an acidic condensation catalyst. It is to be understood, however, that these products are stable and can be stored for long periods of time without curing to an appreciable extent and without formation of insoluble precipitates.

It is to be understood that various modifications may be made in the procedure herein described without departing from the spirit or scope of the present invention except as set forth in the accompanying claims.

We claim:

1. A process for the production of clear pentaerythritol-acrolein resins comprising the steps of reacting pentaerythritol with acrolein in the amount of 1 to 2 moles of acrolein per mole of pentaerythritol in the presence of an acidic condensation catalyst selected from the group consisting of p-toluenesulfonic acid, oxalic acid, hydrochloric acid, phosphoric acid, and boron trifluoride to form an aqueous solution containing pentaerythritol-acrolein prepolymer and said acid catalyst, treating said aqueous solution with a basic anion exchange resin selected from the group consisting of polyamine-modified phenol-formaldehyde resins and quaternary amine resins thereby forming an acidic catalyst-anion exchange resin complex, separating said anion exchange resin and said acidic-catalyst-anion exchange resin complex from said aqueous prepolymer solution, dehydrating the aqueous prepolymer solution to obtain a substantially anhydrous deionized prepolymer residue, adding to said prepolymer residue an acidic condensation catalyst, and therafter heating said prepolymer-catalyst mixture to form a hard, clear pentaerythritol-acrolein resin.

2. The process of claim 1 wherein the acidic condensation catalyst is p-toluenesulfonic acid.

3. The process of claim 2 wherein the basic anion exchange resin is a polyamine-modified phenol-formaldehyde resin.

4. The hard, clear, pentaerythritol-acrolein resin that is the product of the process of claim 1.

References Cited in the file of this patent

UNITED STATES PATENTS 2,401,776     Rothrock _____ June 11, 1946
2,478,154     Evans _____ Aug. 2, 1949

OTHER REFERENCES

Schulz et al.: Angewandte Chemie, vol. 62, No. 5 (1950), pp. 105–118.

Nachod: Ion Exchange, June 21, 1949, pp. 62–63 and p. 371, published by Academic Press Inc., N.Y.